United States Patent
Honji et al.

(10) Patent No.: US 7,887,123 B2
(45) Date of Patent: Feb. 15, 2011

(54) FRONT BODY STRUCTURE OF AUTOMOTIVE VEHICLE

(75) Inventors: Hiromasa Honji, Hiroshima (JP); Masaki Ueno, Hiroshima (JP); Sakayu Terada, Hiroshima (JP); Michinari Watanabe, Higashihiroshima (JP)

(73) Assignee: Mazda Motor Corporation (JP)

( * ) Notice: Subject to any disclaimer, the term of this patent is extended or adjusted under 35 U.S.C. 154(b) by 281 days.

(21) Appl. No.: 12/260,355

(22) Filed: Oct. 29, 2008

(65) Prior Publication Data
US 2009/0146455 A1 Jun. 11, 2009

(30) Foreign Application Priority Data
Dec. 5, 2007 (JP) ............................. 2007-314471

(51) Int. Cl.
*B62D 21/15* (2006.01)
(52) U.S. Cl. ............................. 296/187.09; 296/193.09; 296/198; 296/203.02; 280/784; 280/488
(58) Field of Classification Search ............ 296/187.09, 296/193.09, 198, 203.02; 280/784; 180/88, 180/124.17
See application file for complete search history.

(56) References Cited

U.S. PATENT DOCUMENTS

| | | | |
|---|---|---|---|
| 5,685,599 A * | 11/1997 | Kitagawa | 296/204 |
| 6,893,078 B2 * | 5/2005 | Saeki | 296/187.09 |
| 7,147,275 B2 * | 12/2006 | Matsuyama et al. | 296/203.02 |
| 7,669,688 B2 * | 3/2010 | Yamaguchi et al. | 180/312 |
| 7,735,870 B2 * | 6/2010 | Kosaka et al. | 280/784 |
| 7,762,619 B2 * | 7/2010 | Baccouche et al. | 296/187.09 |
| 2008/0122264 A1 * | 5/2008 | Wrobel et al. | 296/203.02 |
| 2009/0102236 A1 * | 4/2009 | List et al. | 296/187.09 |
| 2009/0243336 A1 * | 10/2009 | Honji et al. | 296/187.09 |
| 2010/0066124 A1 * | 3/2010 | Terada et al. | 296/187.09 |
| 2010/0084889 A1 * | 4/2010 | Tamakoshi | 296/187.09 |
| 2010/0194145 A1 * | 8/2010 | Akaki et al. | 296/187.08 |

FOREIGN PATENT DOCUMENTS

| | | |
|---|---|---|
| EP | 1149756 A2 | 10/2001 |
| EP | 1184262 A1 | 3/2002 |
| EP | 1834862 A1 | 9/2007 |
| FR | 2809072 | 11/2001 |
| JP | 2003-182633 A | 7/2003 |
| JP | 2003-220977 | 8/2003 |

OTHER PUBLICATIONS

Goncalves M. Matos, "European Search Report", EP08019945, Feb. 18, 2009.

* cited by examiner

*Primary Examiner*—Jason S Morrow
(74) *Attorney, Agent, or Firm*—Studebaker & Brackett PC; Donald R. Studebaker

(57) ABSTRACT

A front side frame includes a bend portion which is operative to bend outward when an impact load acts on the front side frame from ahead. The bend portion is provided in a specified location such that the bend portion in a bending state substantially contacts a damper of the suspension from a vehicle front side. Accordingly, a rear end of the front side frame can be prevented properly from moving back when the impact load acts on the front side frame from ahead.

10 Claims, 16 Drawing Sheets

FRONT BODY STRUCTURE OF AUTOMOTIVE VEHICLE

BACKGROUND OF THE INVENTION

The present invention relates to a front body structure of an automotive vehicle, and in particular, relates to the structure for impact absorption.

Japanese Patent Laid-Open Publication No. 2003-220977 discloses a front body structure of an automotive vehicle, in which there is a pair of right and left front side frames which extends in a vehicle longitudinal direction in front of a dash panel, and the front side frame includes first and second bend portions which are operative to bend in a vehicle width direction when an impact load acts on the front side frame from ahead. According to the structure, the impact load acting on the front side frame is absorbed by bending of the front side frame.

Herein, there is a concern that a rear end of the front side frame may move back along with the dash panel, for example, in a case in which the above-described absorption of the impact load at the first and second bend portions is not sufficient. Further, in a case in which a curve portion which curves downward and extends below the dash panel is provided at a rear portion of the front side frame, there is a concern that the front side frame may be broken at the curve portion and move back if the impact-load absorption was not sufficient.

Herein, there is a case in which the front body structure of an automotive vehicle comprises a suspension tower to support a front tire via a suspension, a front hinge pillar which is provided behind the suspension tower, and an apron reinforcement provided so as to interconnect an outside portion of the suspension tower and the front hinge pillar.

SUMMARY OF THE INVENTION

An object of the present invention is to provide a front body structure which can properly prevent the rear end of the front side frame from moving back when the impact load acts on the front side frame from ahead.

According to the present invention, there is provided a front body structure of an automotive vehicle, comprising a suspension tower to support a front tire via a suspension, a front side frame provided so as to extend in a vehicle longitudinal direction inside the suspension tower, an apron reinforcement provided so as to interconnect an outside portion of the suspension tower and a front hinge pillar which is provided behind the suspension tower, and a side sill provided so as to extend in the vehicle longitudinal direction behind a wheel house accommodating the front tire, wherein the front side frame includes a bend portion which is operative to bend outward when an impact load acts on the front side frame from ahead, the bend portion being provided in a specified location such that the bend portion in a bending state substantially contacts a damper of the suspension from a vehicle front side.

According to the present invention, the bend portion of the front side frame bends outward in the vehicle width direction when the impact load acts on the front side frame from ahead. Herein, since the bend portion is provided in the specified location such that the bend portion in the bending state substantially contacts the damper of the suspension from a vehicle front side, the front side frame being bending hits against a front side portion of the damper of the suspension. Accordingly, part of the impact load acting on the front side frame is transmitted to the front hinge pillar via the damper, the suspension tower and the apron reinforcement (a first route). The hitting of the front side frame against the damper pushes back the damper, so that the tire hits against the side sill. Thereby, part of the impact load acting on the front side frame is also transmitted to the side sill via the damper and the tire (a second route). Thus, according to the present invention, the impact load which acts on the front side frame from ahead is dispersed to the front hinge pillar and the side sill via the first route and the second route. Accordingly, it can be properly prevented that the front side frame moves back due to the impact load acting thereon. In particular, in a case in which a curve portion is provided at a rear portion of the front side frame, the load acting on this curve portion can be reduced, thereby preventing an improper vertical move of the curve portion and a breakage of the curve portion accordingly. Herein, the above-described bend portion may be comprised of not only a single portion but plural portions as long as the bend portion is provided in the specified location such that the bend portion in the bending state substantially contacts the damper of the suspension from the vehicle front side.

According to an embodiment of the present invention, a dash panel is provided between right and left front pillar hinges, and there is provided a connection member to connect the dash panel to a specified portion of the suspension tower which is near a top portion of the suspension tower. Thereby, the part of the impact load which has been dispersed to the suspension tower is transmitted to the front hinge pillar, in addition to the apron reinforcement, via the connection member and the dash panel.

According to another embodiment of the present invention, the connection member is configured to connect to the apron reinforcement. Thereby, the efficient load transmission can be conducted in corporation with these members.

According to another embodiment of the present invention, a dash panel is provided between right and left front pillar hinges, there is provided a cowl box which extends in a vehicle width direction between an upper portion of the dash panel and an upper portion of the suspension tower, a bottom wall portion of the cowl box is configured to interconnect a rear wall portion of the suspension tower and the dash panel, and there is provided a reinforcement member which is provided below the cowl box so as to interconnect the rear wall portion of the suspension tower and the dash panel and forms a closed cross section together with the bottom wall portion of the cowl box in a vehicle elevation view. Thereby, the part of the impact load which has been dispersed to the suspension tower is effectively transmitted to the front hinge pillar, in addition to the apron reinforcement, via the cowl box, the reinforcement member and the dash panel.

According to another embodiment of the present invention, the reinforcement member is configured to form a closed cross section together with an apron panel which forms a body-side-wall inner face between the suspension tower and the dash panel below a side portion of the cowl box and the bottom wall portion of the cowl box. Thereby, a properly large closed cross section can be provided inward from the apron reinforcement by using the apron panel forming the body-side-wall inner face of the vehicle. Accordingly, the impact load is dispersed in the vehicle width direction, so that the dispersion of the impact load can be further effectively conducted.

Herein, in a case in which the front side frame is provided so as to curve downward beside the suspension tower and extends below the dash panel as described above, there is a concern that the front side frame may be broken at the curve portion and move back when the impact load could not be absorbed properly.

According to another embodiment of the present invention, the front side frame is provided so as to curve downward beside the suspension tower and extend below the dash panel, and the reinforcement member has an extension portion which extends obliquely forward and downward and connects to the front side frame beside the suspension tower. Thereby, since the extension portion is provided, the improper vertical move of the front side frame can be properly restricted by this extension portion.

According to another embodiment of the present invention, an upper arm of the suspension is supported at the reinforcement member. Thereby, the load acting on the upper arm can be received at the reinforcement member firmly and transmitted and dispersed to the suspension tower, dash panel and the like via the reinforcement member effectively. Further, the support portion of the upper arm can be formed by using the reinforcement member.

According to another embodiment of the present invention, there is provided a second reinforcement member which interconnects a specified portion of the front side frame which is near the suspension tower and a specified portion of the dash panel which is located inward from the front side frame. Thereby, the front side frame can be prevented from bending inward at the bend portion, so that the outward bending of the front side frame can be achieved surely.

Other features, aspects, and advantages of the present invention will become apparent from the following description which refers to the accompanying drawings.

BRIEF DESCRIPTION OF THE DRAWINGS

FIGS. 16A, 15B, 16C are explanatory diagrams of the action.

DETAILED DESCRIPTION OF THE INVENTION

Hereinafter, a front body structure of an automotive vehicle according to preferred embodiments of the present invention will be described.

Figure 1:
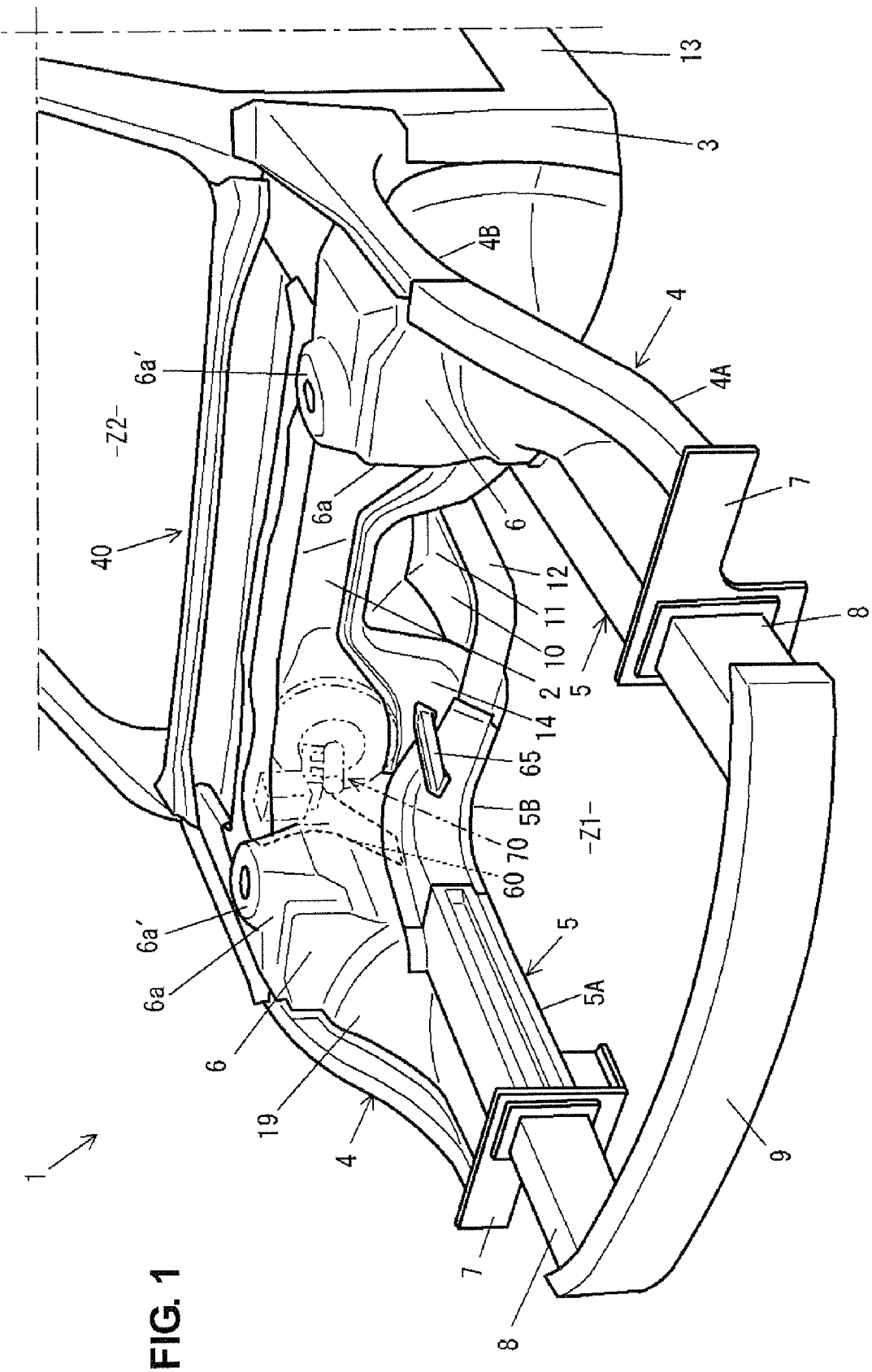
FIG. 1 is a perspective view showing a front body structure of an automotive vehicle according to an embodiment of the present invention, when viewed from the vehicle front.

As shown in FIG. 1 (see FIGS. 2-4 suitably), an automotive vehicle 1 of the present embodiment has a pair of hinge pillars 3 (only one illustrated) which is provided at both-side end portions of a dash panel 2 so as to extend vertically and pivotally support front doors (not illustrated). Apron reinforcements 4, 4 extend forward from respective upper end portions of the right and left hinge pillars 3. Front side frames 5, 5 extend in a vehicle longitudinal direction substantially in parallel to and inside of the apron reinforcements 4, 4 in a plan view. A wheel house 6 for a front wheel is provided between the apron reinforcement 4 and the front side frame 5 in a vehicle width direction.

To front end portions of the front side frame 5 and the apron reinforcement 4 are attached flat plates 7, 7. A bumper reinforcement 9 which extends in the vehicle width direction is attached to the both plates 7, 7 via crash boxes 8, 8. The crash boxes 8, 8 are configured to have a compressive deformation in the vehicle longitudinal direction when a longitudinal impact load acts thereon.

A lower portion of the dash panel 2 curves rearward, and its lower end is joined to a front end portion of a floor panel 10. A tunnel portion 11 is provided at the lower portion of the dash panel 2 and the floor panel 10 so as to extend longitudinally and project upward substantially at the center of the vehicle.

A rear portion of the front side frame 5 curves downward beside the wheel house 6, and its rear end connects to a front end of a floor frame 12 which extends in the vehicle longitudinal direction below the floor panel 10 (see FIG. 2). The floor frame 12 has a cross section which is of a U shape and forms a closed cross section, which extends in the vehicle longitudinal direction, together with the floor panel 10.

A side sill 13 extends rearward from a lower end portion of the front hinge pillar 3. The side sill 13 has a closed cross section which extends in the vehicle longitudinal direction.

Figure 3:
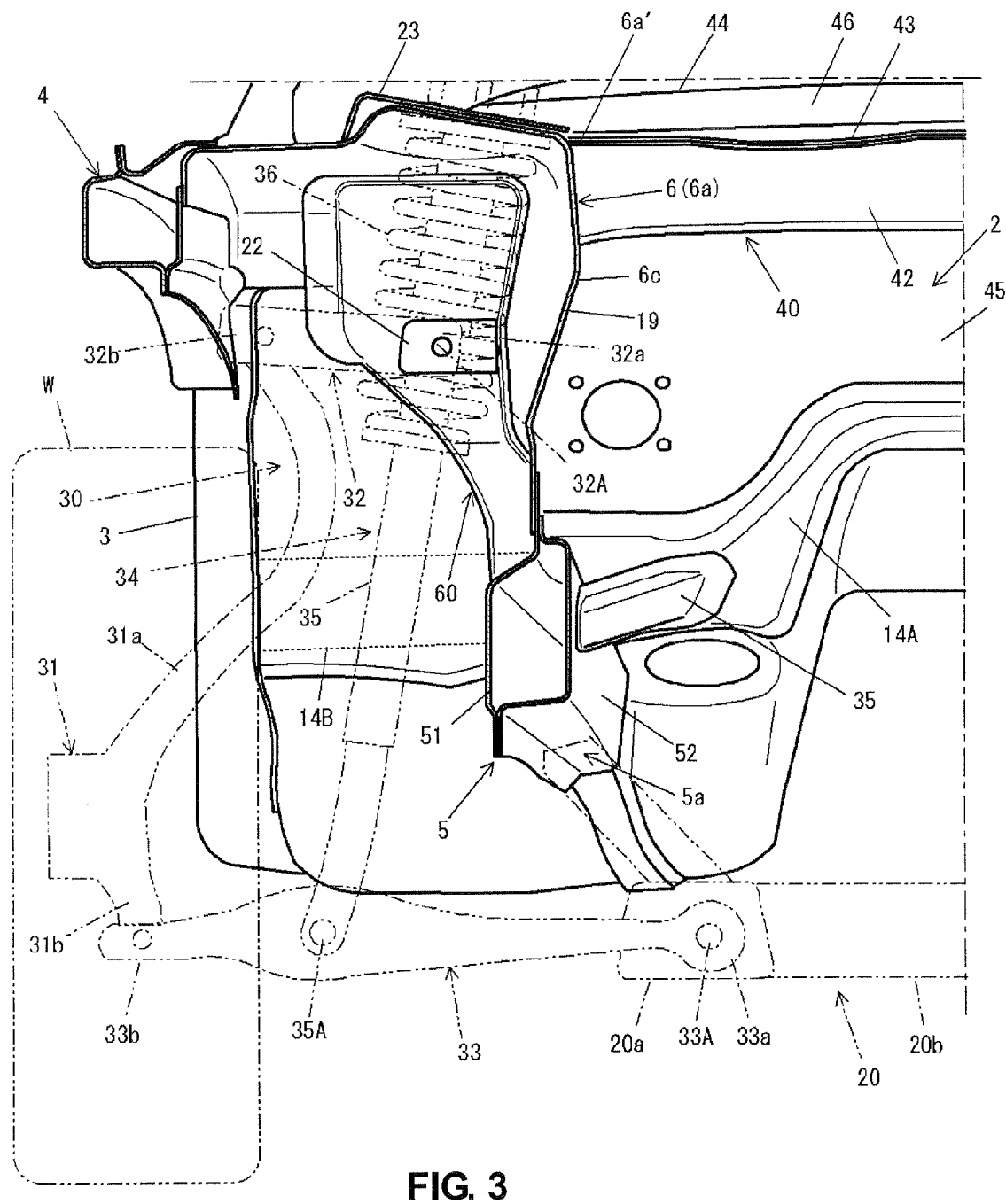
FIG. 3 is a sectional view taken along line A-A of FIG. 2.

Below the dash panel 12 is provided a lower dash cross member 14 to interconnect the right and left front hinge pillars 3, 3. The lower dash cross member 14 comprises, as shown in FIG. 3, a center member 14A which forms a central portion between both the front side frames 5, 5 and side members 14B, 14B which interconnect end portions of the center members 14A and the front hinge pillars 3, 3.

The center member 14A, which has a U-shaped cross section, is provided at a front face of the dash panel 2 (a face on the side of an engine-room Z1) and forms a closed cross section together with the front face of the dash panel 2. The side members 14B, which have a U-shaped cross section, are provided at a rear face of the dash panel 2 (a face on the side of an vehicle compartment Z2) and forms a closed cross section together with the rear face of the dash panel 2 (see FIGS. 5 and 6).

Figure 7:
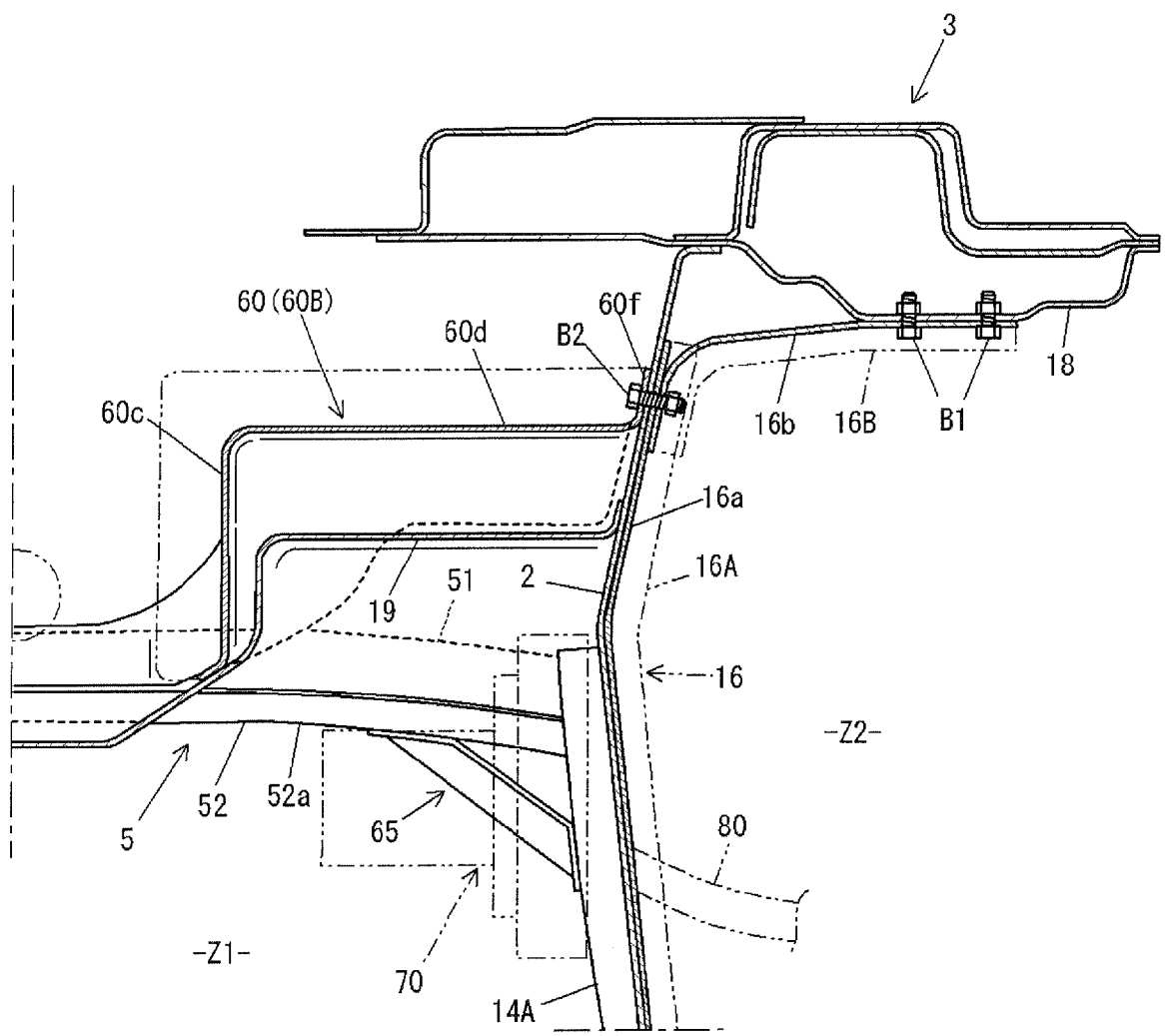
FIG. 7 is a sectional view taken along line G-G of FIG. 2.

Above the dash panel 12 is provided an upper dash cross member 16 to interconnect the right and left front hinge pillars 3, 3 as shown in FIG. 7. The upper dash cross member 16 comprises, as shown in FIG. 3, a center member 16A which forms a central portion between both portions near the right and left hinge pillars 3, 3 and side members 16B, 16B which interconnect end portions of the center members 16A and the front hinge pillars 3, 3. The center member 14A and the side members 16B, which have a U-shaped cross section, are provided at a rear face of the dash panel 2 (a face on the side of the vehicle compartment Z2).

Figure 5:
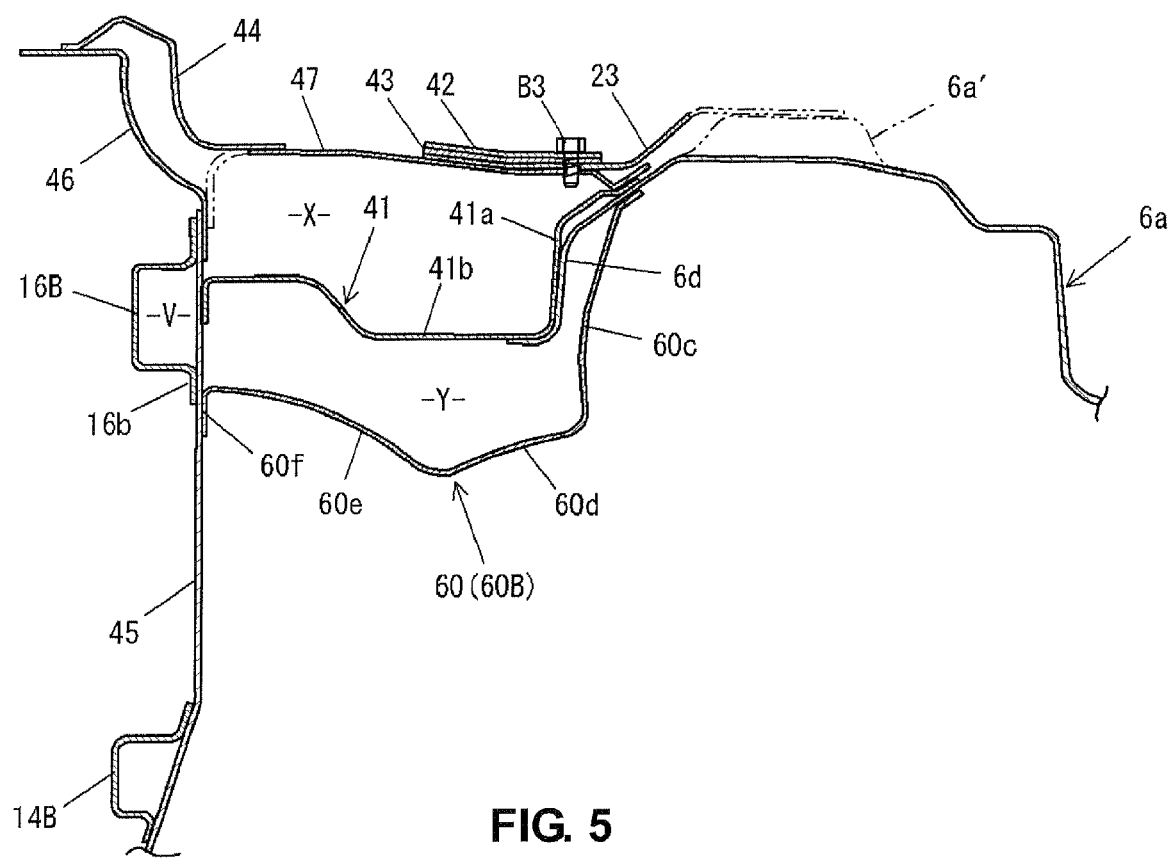
FIG. 5 is a sectional view taken along line B-B of FIG. 4.
Figure 6:
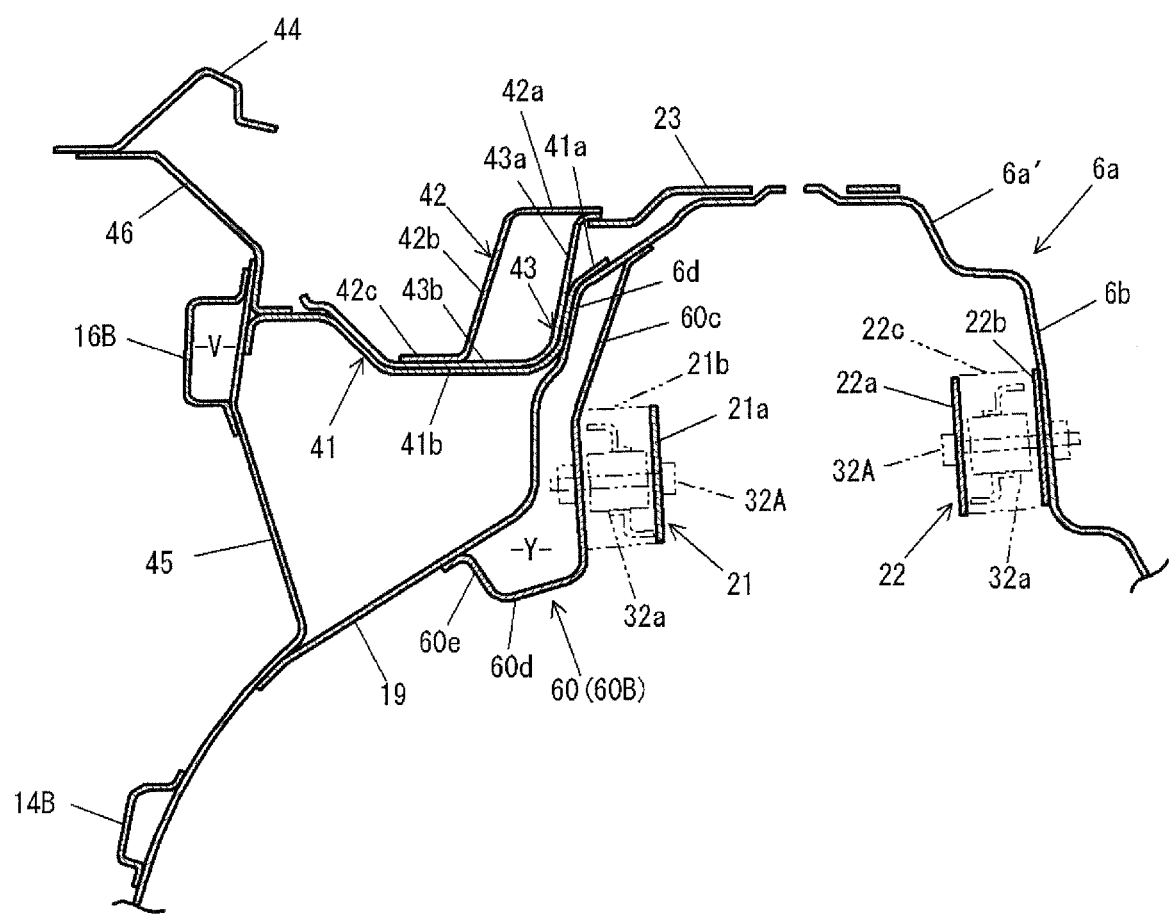
FIG. 6 is a sectional view taken along line I-I of FIG. 4.

Specifically, as shown in FIG. 7, the side member 16B is fastened to an inner panel 18 of the front hinge pillar 3 at rear ends of upper and lower flanges 16b, 16b via bolts and nuts B1, B1, and its front end portion is fastened to a flange 60f of a reinforcement member 60, which will be described later, together with a flange portion 16a of an end portion of the center member 16A and the dash panel 2. Thereby, as shown in FIGS. 5 and 6, the dash panel 2, the center member 16A, and the side members 16B, 16B form a closed cross section V which extends in the vehicle width direction between both the hinge pillars 3, 3.

Figure 4:
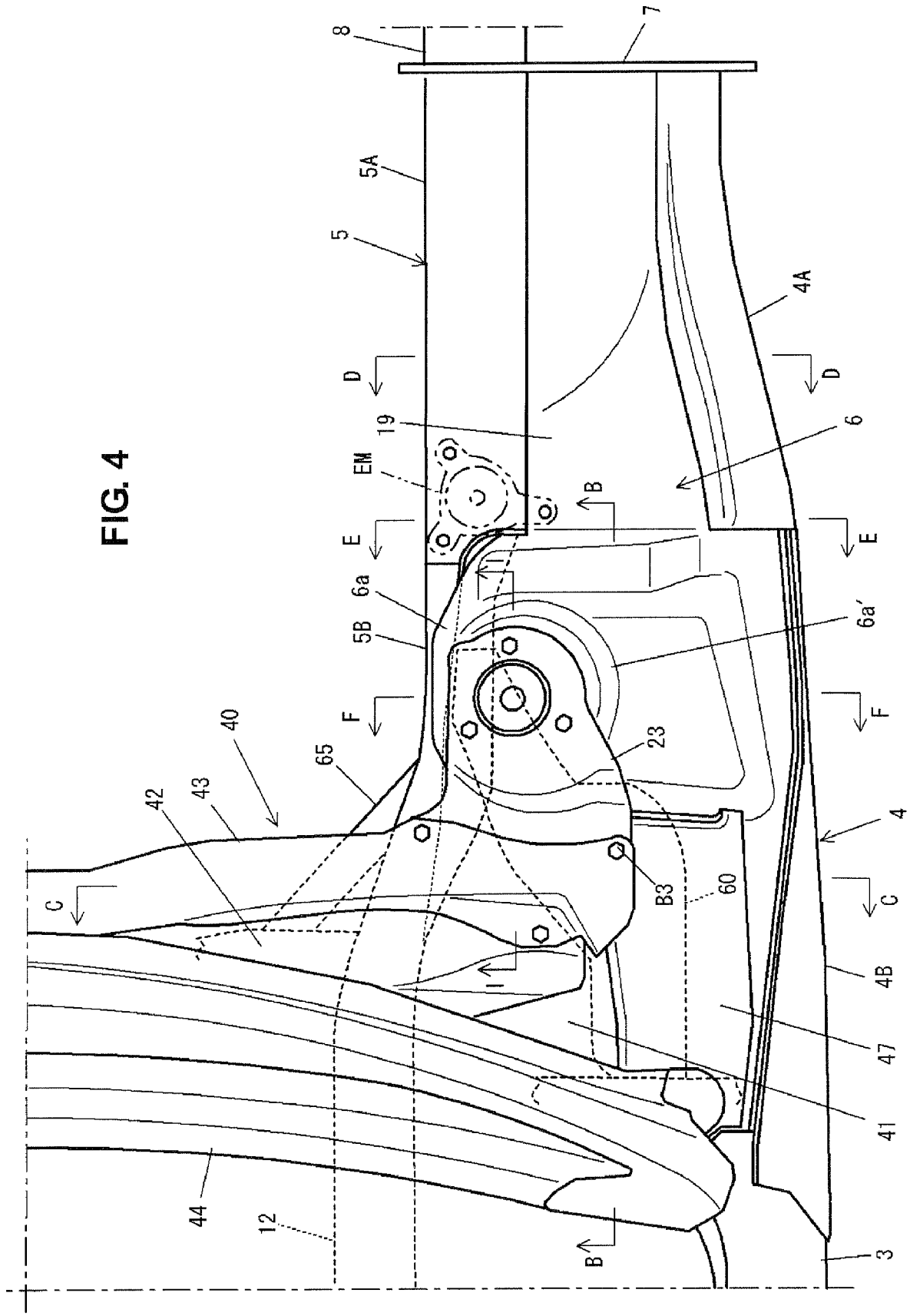
FIG. 4 is a plan view of the front body structure.

As apparent from FIGS. 1, 3 and 4, the wheel house 6 is comprised of an apron panel 19, an outer end of which is joined to the apron reinforcement 4, and an inner end of which is joined to the front side frame 5. The wheel house 6 is formed in such a manner that a rear portion of the apron panel 19 projects upward in an arch shape. At an upper portion of the wheel house 6 is formed a suspension tower 6a which supports an upper portion of the suspension 30. The suspension tower 6a is formed in such a manner that a wheel house inner panel 19 projects upward in a tower shape.

Herein, a front suspension 30 and its attachment structure will be described briefly. As shown in FIGS. 2 and 3, a suspension support frame 20 to support a lower portion of the suspension 30 below the front suspension 30. The suspension support frame 20 has a frame shape in a plan view, and its right and left side portions 20a, 20b extend longitudinally substantially below the front side frames 5, 5. Front ends of the side portions 20a, 20b are attached to lower portions of the front ends of the front side frames 5, 5, rear portions of the side portions 20a, 20b which are located rearward of their center are attached to lower portions of curve portions 5a, 5a of the front side frames 5, 5, and rear ends of the side portions 20a, 20b are attached to a cross member (not illustrated) which is provided at a front end portion of the floor panel 10, respectively, via brackets, mount rubber or the like.

The front suspension 30 is a double wishbone type of suspension, and comprises a wheel support 31 to rotatably support a tire W (wheel), an upper arm 32 and a lower arm 33 which are disposed vertically away from each other, and a shock absorber 34.

Suspension support members 21, 22 are attached to a specified face of the suspension tower 6a of the wheel house inner panel 19 which is on the opposite side to the engine room Z1.

The upper arm 32 is of an A shape, and its inner end portions 32a, 32a are attached so as to rotate around axis members 32A, 32A which extend in the vehicle longitudinal direction and supported at brackets 21, 22. The axis members 32A, 32A are comprised of bolts and nuts, for example. Meanwhile, outer end portions 32b, 32b of the upper arm 32 are attached to an upper end portion of an upper extension portion 31a which is formed at the wheel support 31 via ball joints.

The brackets 21, 22 to support the inner end portions 32a, 32a of the upper arm 32 have different shapes from each other. That is, the front bracket 22 has a U shape in the plan view, and as shown in FIG. 6, it comprises vertical face portions 22a, 22b to support an end portion of the axis member 32A and a side face portion 22c to interconnect the vertical face portions 22a, 22b. The rear vertical face portion 22b and the side face portion 22c are joined to a front face portion 6b and a side face portion 6c of the suspension tower 6a (see FIG. 2). Meanwhile, the rear bracket 21 is of an L shape in the plan view, and it comprises a rear vertical face portion 21a and a side face portion 21b. The side face portion 21b is joined to a side face portion 6c of the suspension tower 6a, and a rear end of the axis member 32A is supported at a front face portion 60c of a reinforcement member 60 which will be described later (see FIG. 2).

Returning to FIGS. 2 and 3, the lower arm 33 is of the A shape like the upper arm 32, and its inner end portions 33a, 33a are attached to a support wall formed at the side portions 20a, 20a of the suspension support frame 20 so as to rotate around axis members 33A, 33A which extend in the vehicle longitudinal direction. The axis members 33A, 33A are comprised of bolts and nuts, for example. Meanwhile, outer end portions 33b, 33b of the lower arm 33 are attached to a lower end portion of a lower extension portion 31b which is formed at the wheel support 31 via ball joints.

The shock absorber 34 comprises a damper 35 and a coil spring 36. An upper end of the damper 35 is fixed to a top portion 6a' of the suspension tower 6a, and its lower end is attached to a central portion of the lower arm 33 so as to rotate around an axis member 35A which extends in the vehicle longitudinal direction. A coil spring 36 is attached to the damper 35 so as to expand.

At an upper face of the top portion 6a' of the suspension tower 6a is provided a suspension attachment reinforcement member 23 to reinforce an attachment portion of the shock absorber 34.

As shown in FIG. 1, a cowl portion 40 is provided above the dash panel 2 so as to extend in the vehicle width direction.

As apparent from FIGS. 3-6, 8 and the others, the cowl portion 40 comprises right and left cowl side panels 41, 41 which form its both end portions, a cowl front upper panel 42 and a cowl front lower panel 43 which interconnect the cowl side panels 41, 41, and a cowl panel 44 which supports a lower end of a vehicle windshield.

The cowl side panel 41, as shown in FIG. 5, comprises a vertical wall portion 41a which has a specified shape corresponding to the rear wall portion 6d of the suspension tower 6a and is joined to this rear wall portion 6d, and a lateral wall portion 41b which extends rearward from a lower end of the vertical wall portion 41a and a rear end portion of which is joined to a dash lower panel 45 constituting a lower portion of the dash panel 2. The cowl side panel 41 is of a substantially L shape in the side view. Herein, the lateral wall portion 41b is provided at a level of the upper dash cross member 16.

The cowl front lower panel 43 comprises a vertical wall portion 43a and a lateral wall portion 43b which are continuous from the vertical wall portion 41a and the lateral wall portion 41b of the cowl side panel 41 in the vehicle width direction.

The vertical wall portion 41a of the cowl side panel 41 and the lateral wall portion 43b of the cowl front lower panel 43 form, together with the dash upper panel 46, a boxy structure which opens upward and has a U shape in the side view.

As shown in FIG. 7, the cowl front upper panel 42 comprises an upper wall portion 42a, a vertical wall portion 42b and a lower wall portion 42c, and is of a substantially Z shape in the side view. The cowl front upper panel 42 forms a substantially tetragonal closed cross section which extends in the vehicle width direction together with the cowl front lower panel 43.

Herein, as shown in FIGS. 4 and 5, the cowl front lower panel 43 and the cowl front upper panel 42 are detachably attached to the above-described suspension attachment reinforcement member 23 and a connection panel 47, which will be described later, via bolts B3 at their both ends.

A connection panel 47 to interconnect the top portion 6a' of the suspension tower 6a and the dash upper panel 46 forming the upper portion of the dash panel 2 is provided as shown in FIGS. 4 and 5. An outside edge portion of the connection panel 47 is joined to the apron reinforcement 4. Herein, the connection panel 47 may be used as a member for attaching a vehicle wiper.

Next, the structure of the apron reinforcement 4 will be described.

Figure 2:
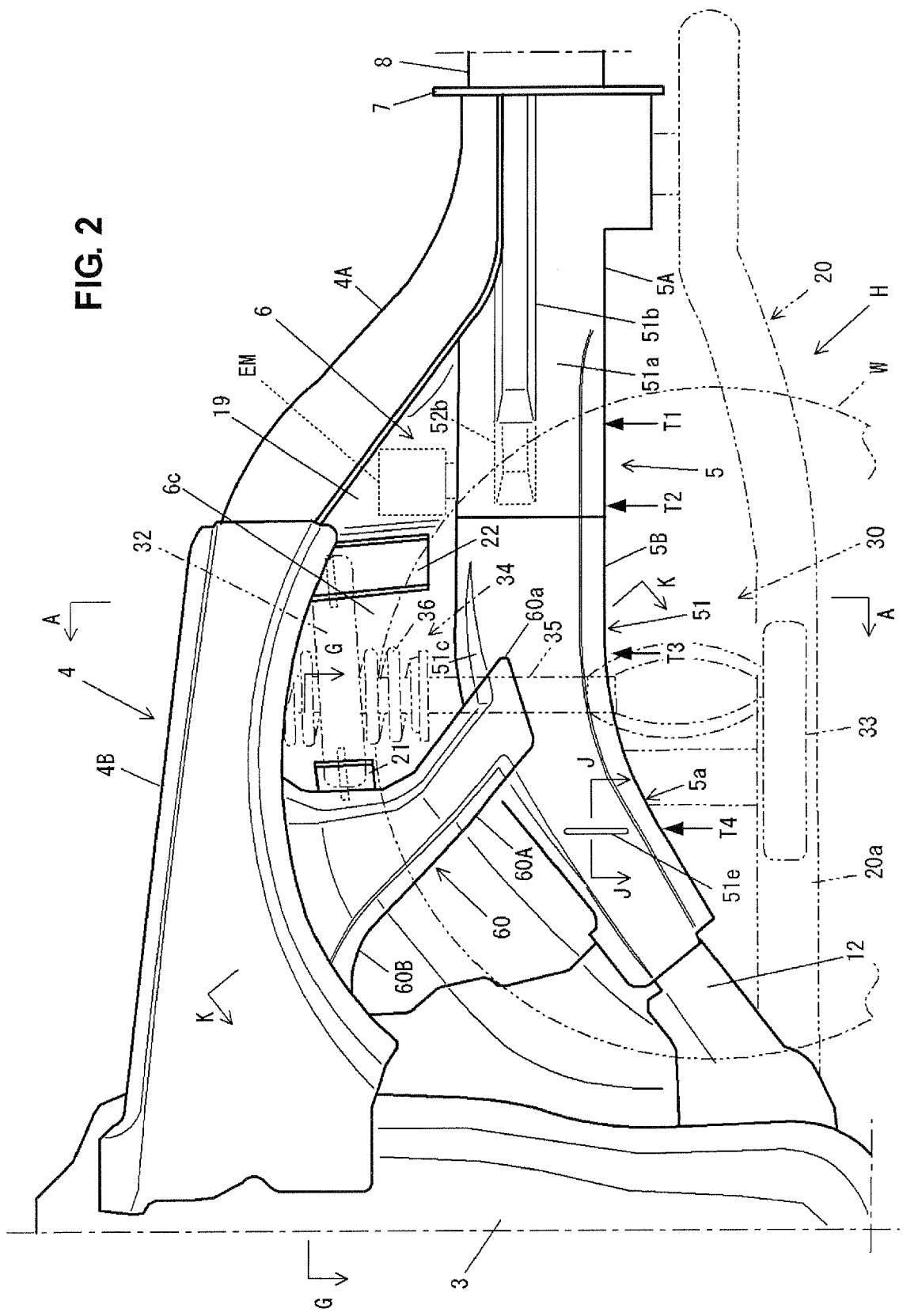
FIG. 2 is a right side view of the front body structure.
Figure 8:
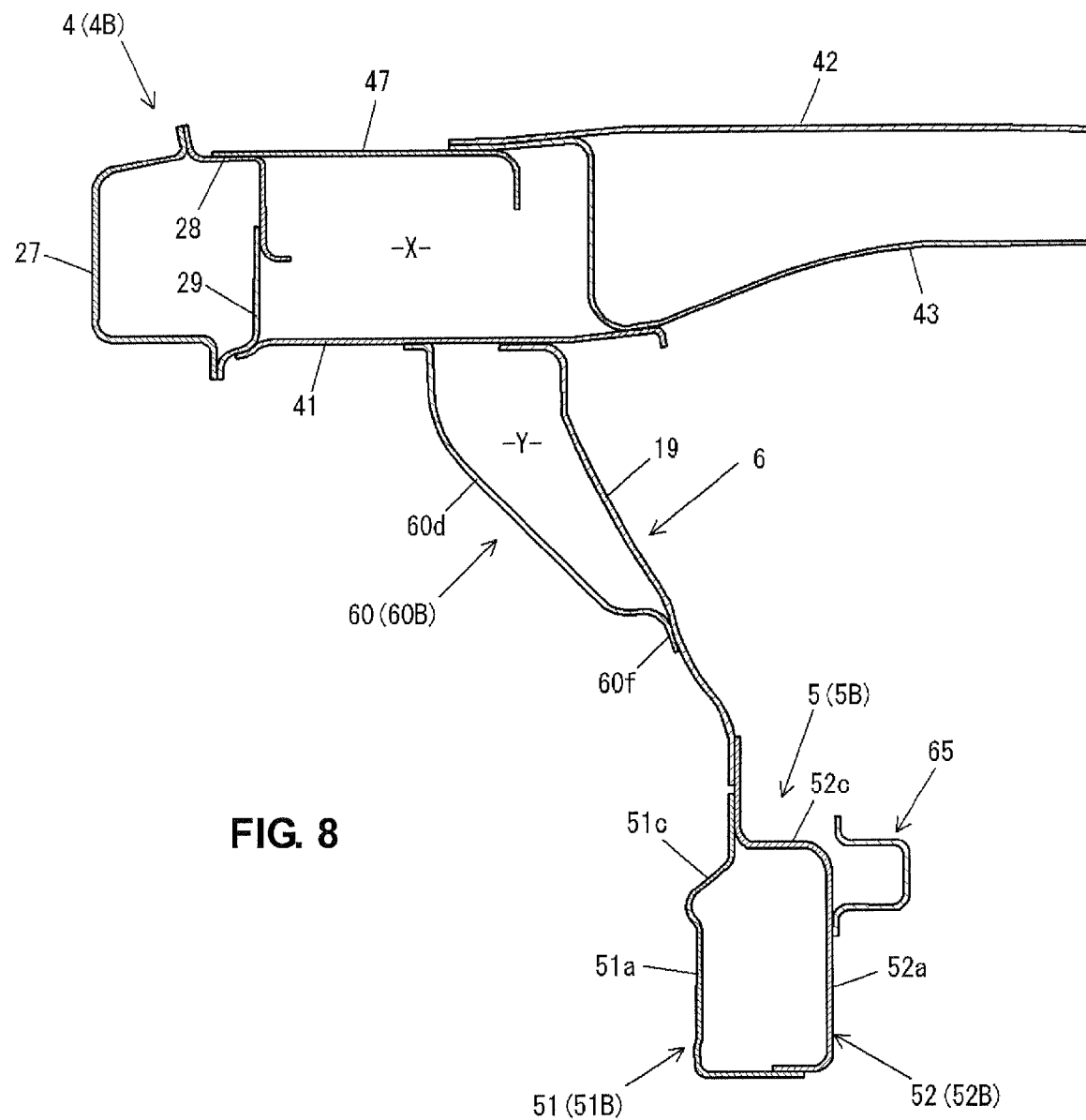
FIG. 8 is a sectional view taken along line C-C of FIG. 4.
Figure 9:
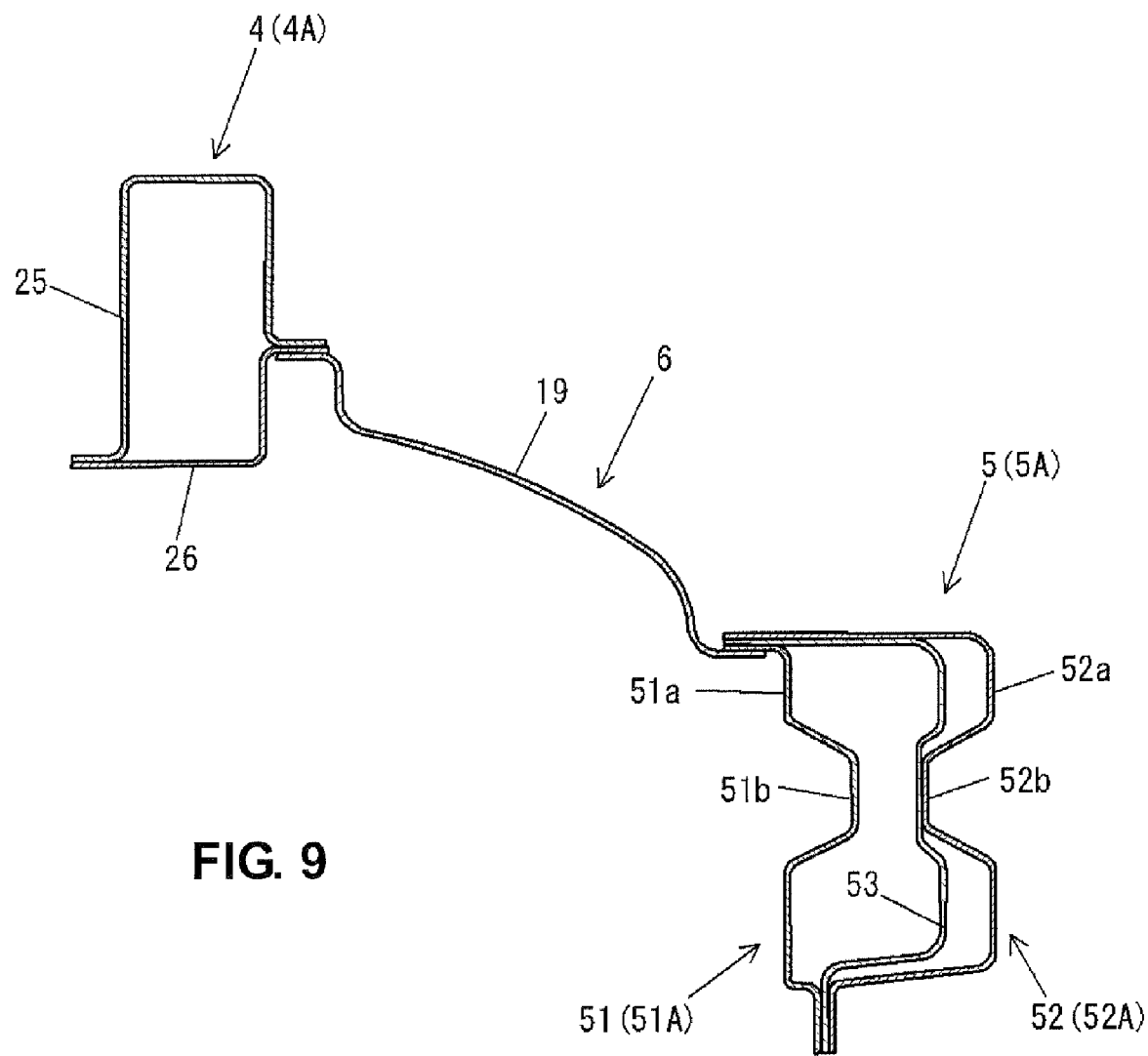
FIG. 9 is a sectional view taken along line D-D of FIG. 4.
Figure 10:
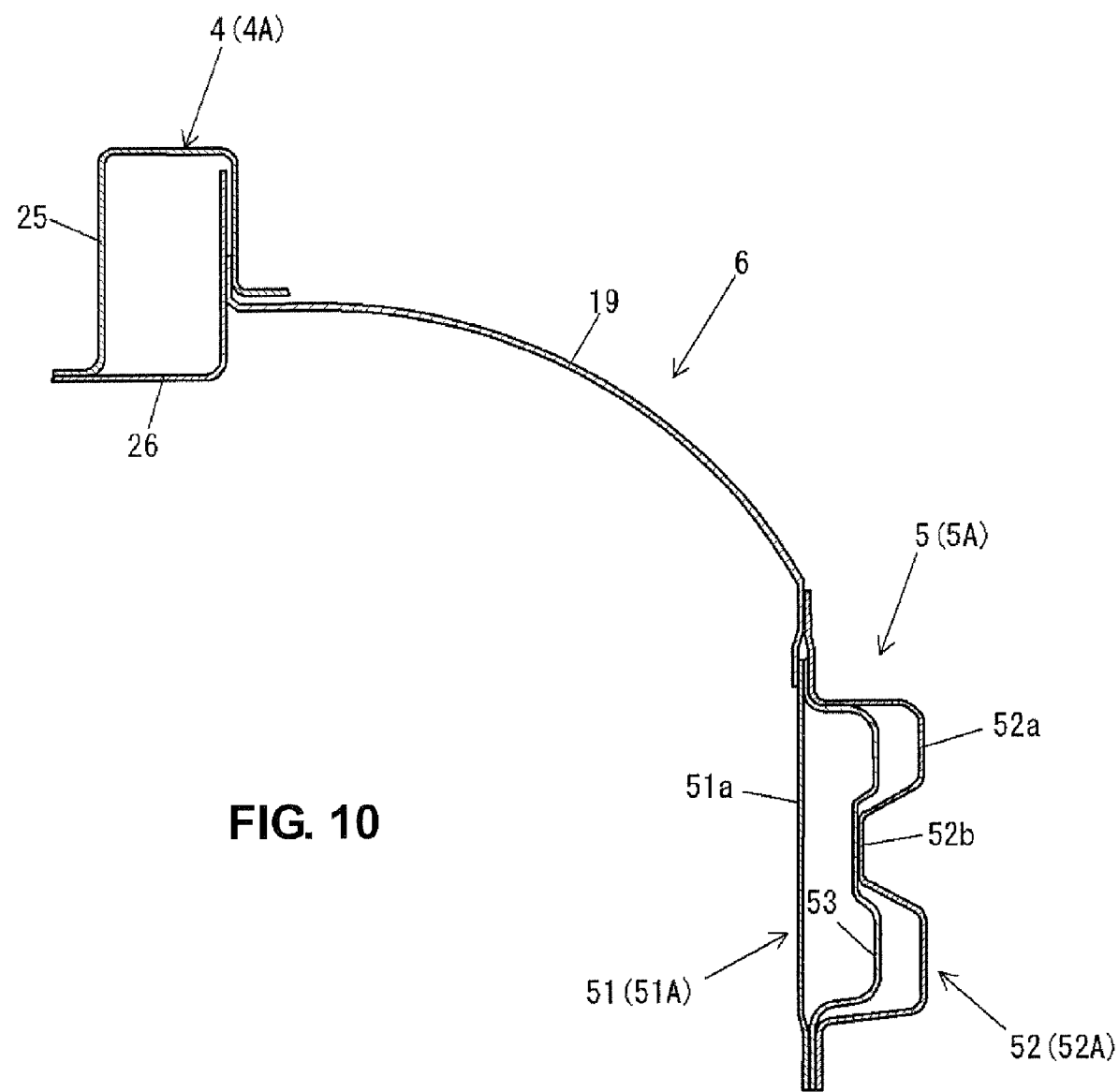
FIG. 10 is a sectional view taken along line E-E of FIG. 4.
Figure 11:
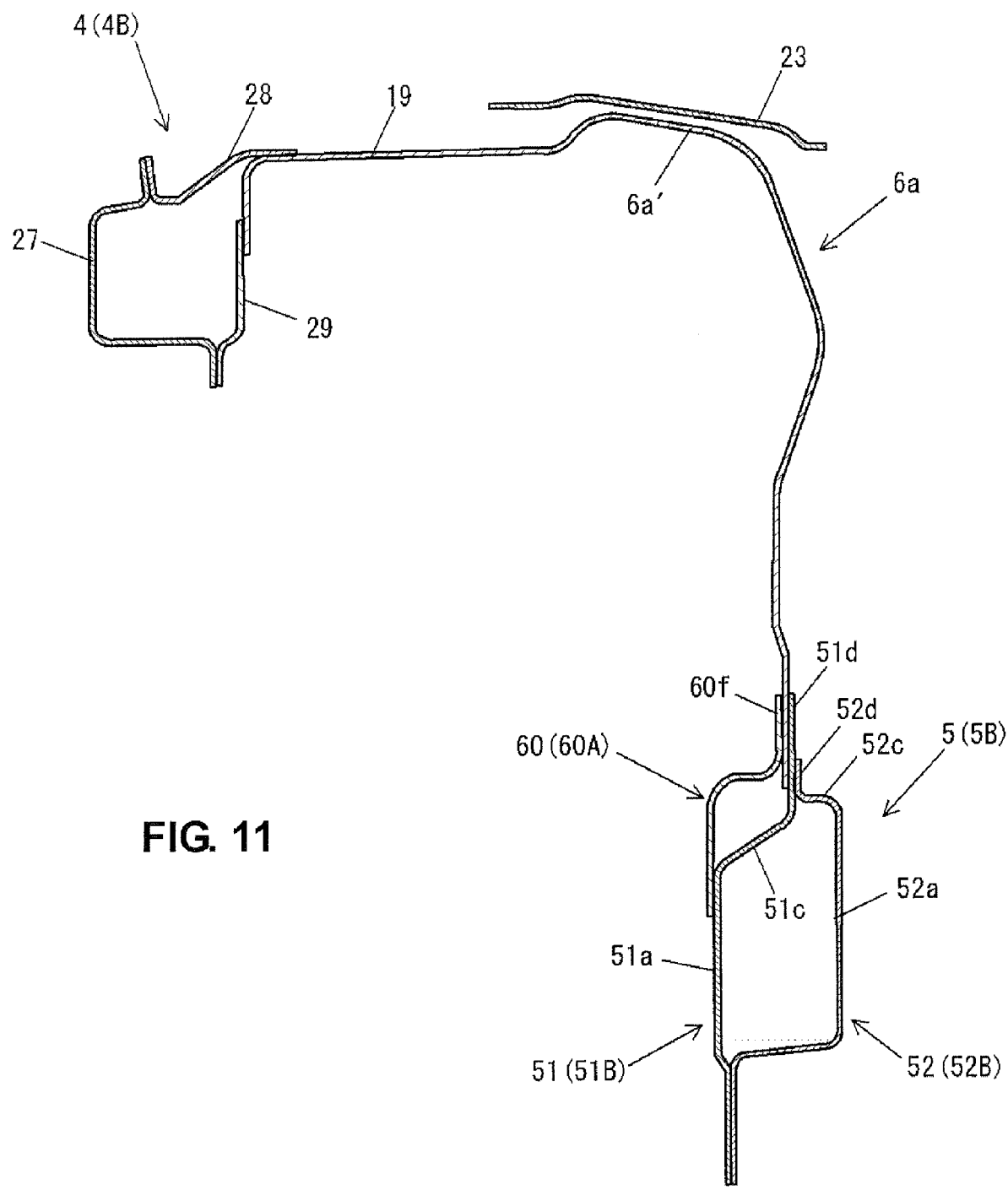
FIG. 11 is a sectional view taken along line F-F of FIG. 4.

The apron reinforcement 4 comprises, as apparent from FIGS. 1 and 2, a front portion 4A located in front of the suspension tower 6a and a rear portion 4B. The front portion 4A has a substantially tetragonal closed cross section which is formed by members 25, 26 and extends in the vehicle longitudinal direction as shown in FIGS. 9 and 10. The rear portion 4B has a substantially tetragonal closed cross section which is continuous from the closed cross section of the front portion 4A, which is formed by members 27, 28, 29 and extends in the vehicle longitudinal direction as shown in FIGS. 8 and 11. Further, the rear portion 4B is configured to have a larger resistance of the load acting from ahead than the front portion 4A. This larger load resistance may be provided by increasing the thickness of the members 27, 28, 29, for example.

Subsequently, the structure of the front side frame 6 will be described in detail.

The front side frame 5 comprises, as apparent from FIGS. 1 and 2, a front portion 5A in front of the suspension tower 6a and a rear portion 5B. The front portion 5A has a substantially tetragonal closed cross section which is formed by an outside member 51A and an inside member 52A and extends in the vehicle longitudinal direction as shown in FIGS. 9 and 10. The rear portion 5B has a substantially tetragonal closed cross section which is continuous from the closed cross section of the front portion 5A, which is formed by an outside member 51B and an inside member 52B and extends in the vehicle longitudinal direction as shown in FIGS. 8 and 11. Inside the closed cross section of the front portion SA is provided a reinforcement 53.

The members 51A, 52A of the front portion 5A and the members 52B, 52B of the rear portion 5B are made from different materials from each other. The members 51A, 52A of the front portion 5A may be made from a high-tension material or the like, for example, so as to be compressible in a bellows shape against the impact load acting thereon, ensuring the sufficient rigidity for its normal state. Meanwhile, the members 51B, 52B of the rear portion 5B may be made of a thicker member so as to have the larger load resistance than the front portion 5A, thereby providing the proper hardness in the compressive deformation.

Further, as shown in FIGS. 9 and 10, beads 51b, 52b are formed on respective side face portions 51a, 52a of the outside member 51A and the inside member 52A of the front portion 5A so as to extend in the vehicle longitudinal direction from their front ends to their specified positions. Herein, the beads 51b, 52b and the reinforcement 53 are provided in order to properly absorb the impact energy during the compressive deformation of the front portion 5A of the front side frame 5 in the vehicle longitudinal direction.

Herein, the bead 51b of the outside member 51 extends, as shown in FIG. 2, from the front end of this member 51 to the specified position slightly before a front end of an engine mount EM, while the bead 52b of the inside member 52 extends rearward further than the bead 51b of the outside member 51, reaching the specified position near a rear end of the engine mount EM. Accordingly, a specified portion of the front frame 5 which has only the bead 52b of the inside member 52 is configured such that its inside portion has a higher compressive rigidity in the vehicle longitudinal direction than its outside portion. Further, as shown in FIG. 4, the width (length of the vehicle longitudinal direction) and the cross section area of the front side frame 5 becomes gradually smaller from its portion near the front end of the suspension tower 6a (the rear end position of the bead 51b of the outside member 51) to its portion near the front end of the top portion 6a' of the suspension tower 6a (the rear end position of the bead 52b of the inside member 52). Accordingly, when the impact load acts from ahead, the front frame 5 can bend outward easily at its position of the rear end of the bead 51b of the outside member 51. Thus, a bend portion T1 to bend outward is formed at the position of the rear end of the bead 51b of the outside member 51.

Further, the front side frame 5 has an attachment portion for the engine mount EM near the front end of the suspension tower 6a as described above. Accordingly, this portion near the attachment portion (a portion between the rear end position of the bead 51b of the outside member 51 and the rear end position of the bead 52b of the inside member 52) is reinforced by a reinforcement member, not illustrated, so that the compressive deformation of the front side frame 5 in the vehicle longitudinal direction can be restrained and its move in the vehicle width direction can be restricted properly. Meanwhile, its rear portion expands so as to project outward, which will be described later. Thus, another bend portion T2 is formed at the position of the rear end of the bead 52b of the inside member 52 (near the rear end of the attachment portion of the engine mount EM).

Also, there occurs difference in rigidity at a specified portion of the front side frame 5 which corresponds to the front end of the reinforcement member 60 which will be described later. Accordingly, this specified portion of the front side frame 5 may easily bend when the impact load acts from ahead. Thus, a bend portion T3 to bend outward is formed at this position.

Figure 12:
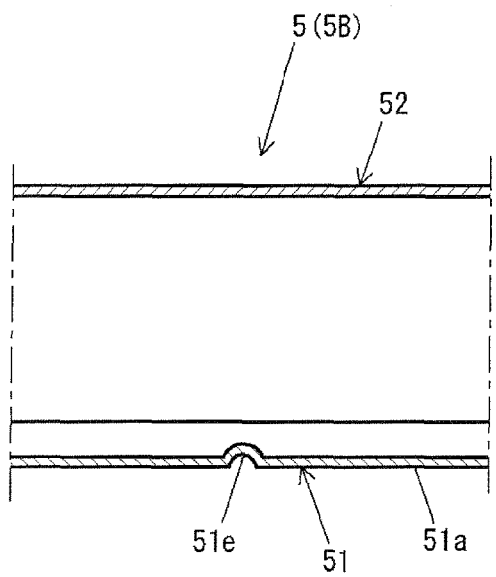
FIG. 12 is a sectional view taken along line J-J of FIG. 4.

As shown in FIG. 2, a bead 51e is formed on the side face portion 51a of the outside member 51 (51B) at a middle portion of the curve portion 5a so as to extend in a vertical direction. The bead 51e is formed so as to recess inward as shown in FIG. 12, and the front portion of the front side frame 5 bends outward at this bead 51e when the impact load acts on the front side frame 5 from ahead as described later. Thus, a bend portion T4 is formed by the bead 51e.

A specified portion of the front side frame 5 which is rearward from the front end of the top portion 6a' of the suspension tower 6a is configured such that the width of an upper face portion 51c of the outside member 51 becomes gradually wider and the width of an upper face portion 52c of the inside member 52 becomes gradually narrower. Accordingly, as apparent from FIG. 11, the lateral positions of upper flange 51d, 52d of the members 51, 52 which are connected to each other are located inward respectively. Further, according to this, an inner end portion (lower end portion) of the apron panel 19 which connects to the upper flanges 51d, 52d is located inward. Thereby, the upper face portion 51c of the outside member 51 of the front side frame 5 is located outward from the inner end portion of the apron panel 19. That is, the front side frame 5 is provided in the front wheel house 6 (suspension tower 6a).

Herein, it is necessary to prevent the curve portion 5a of the front side frame 5 from being broken when the impact load acts on the front side frame 5 from ahead.

It may be considered for the above-described prevention of the breakage that there is provided a reinforcement member to interconnect the side portion of the suspension tower 6a of the wheel house 6 and the dash panel 2 (vehicle body member). According to the present embodiment, however, as shown in FIGS. 1 and 7, a master cylinder 70 of a brake device is attached to a front face of the dash panel 2 in front of a driver's seat and in back of the wheel house 6. Therefore, it may be difficult to provide the reinforcement member 60 at a face of the apron panel 19 on the side of engine room Z1.

Figure 13:
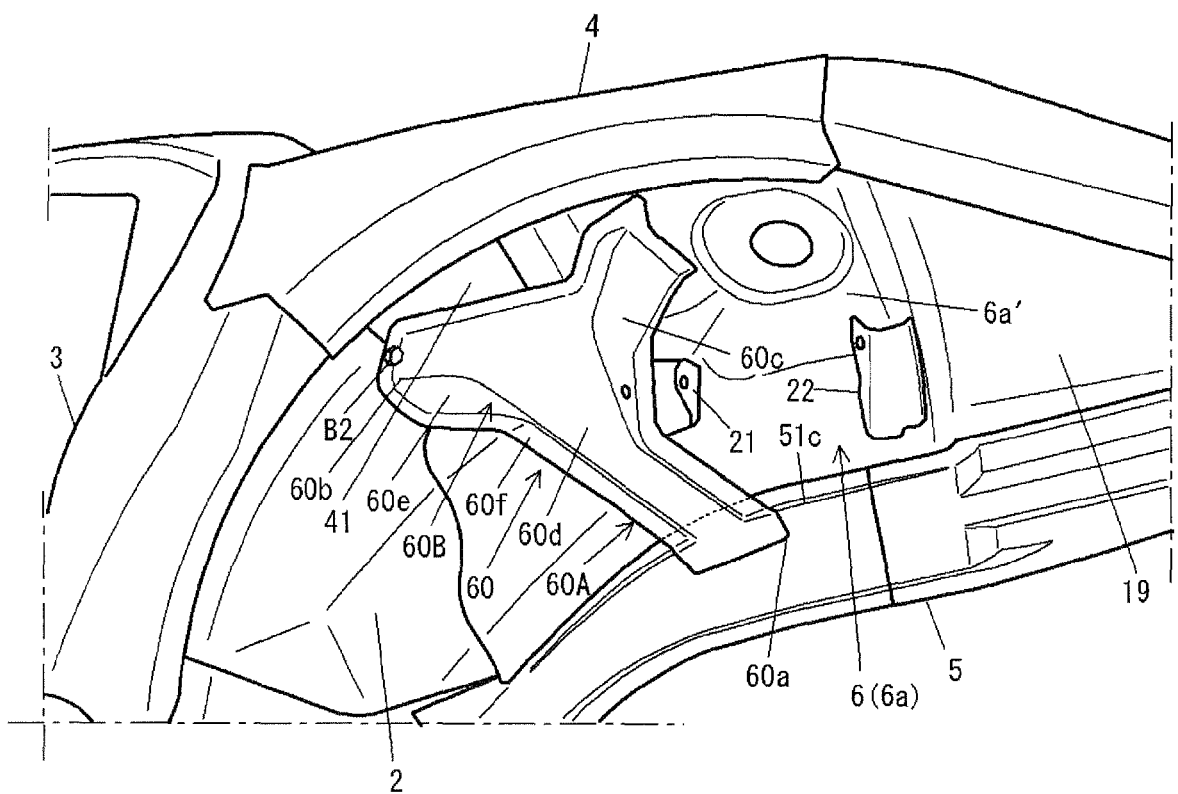
FIG. 13 is a perspective view, when viewed from an arrow H of FIG. 2 and obliquely outward.

According to the present embodiment, the reinforcement member 60 is provided at the face of the apron panel 19 which is on the opposite side to the engine room Z1 as shown in FIGS. 1 and 13. Namely, it is provided in the wheel house 6.

Specifically, as apparent from FIGS. 2 and 13, a front end portion 60a of the reinforcement member 60 is connected to the outside member 51 (the portion of the front side frame 5 in the wheel house 6) of the front side frame 5 in front of the damper 35 of the suspension 30, and its rear end portion 60b is connected to a specified portion of the dash panel 2 (vehicle body member) which is rearward from the wheel house 6.

A rear portion 60B of the reinforcement member 60 extends upward into the top portion 6a' of the suspension tower 6a and is connected to an inner face of the top portion 6a'.

Further, the reinforcement member 60 comprises a front face portion 60c, a side face portion 60d, a rear face portion 60e, and a flange portion 60f, and has a cross section of a substantially U shape with an inward opening. A lower end of the side face portion 60d is formed so as to be continuous to the side face portion 51a of the outside member 51 of the front side frame 5 (see FIG. 14). Thus, the front end portion 60a of the reinforcement member 60 contacts the upper face portion 51c of the outside member 51 of the front side frame 5.

As apparent from FIGS. 8, 11 and 13, the flange portion 60f is joined to the specified face of the apron panel 19 on the opposite side to the engine room Z1 (the inner face of the wheel house 6), the front face of the dash panel 2, the lower face of the cowl side panel 41, the upper face portion 51c of the outside member 51 of the front side frame 5, and the upper portion of its side face portion 51a. Accordingly, the reinforcement member 60, the apron panel 19, the cowl side panel 31, and the outside member 51 of the front side frame 5 form the closed cross section Y which extends in the vehicle longitudinal direction between the suspension tower 6a and the dash panel 6.

A portion of the flange portion 60f of the reinforcement member 60 which is connected to the dash panel 2 is joined together with the dash panel 2 and the upper dash cross member 16 via a bolt and nut B2 as shown in FIG. 7. Thus, the rear end portion 60b is connected to the upper dash cross member 16 via the dash panel 2.

Figure 14:
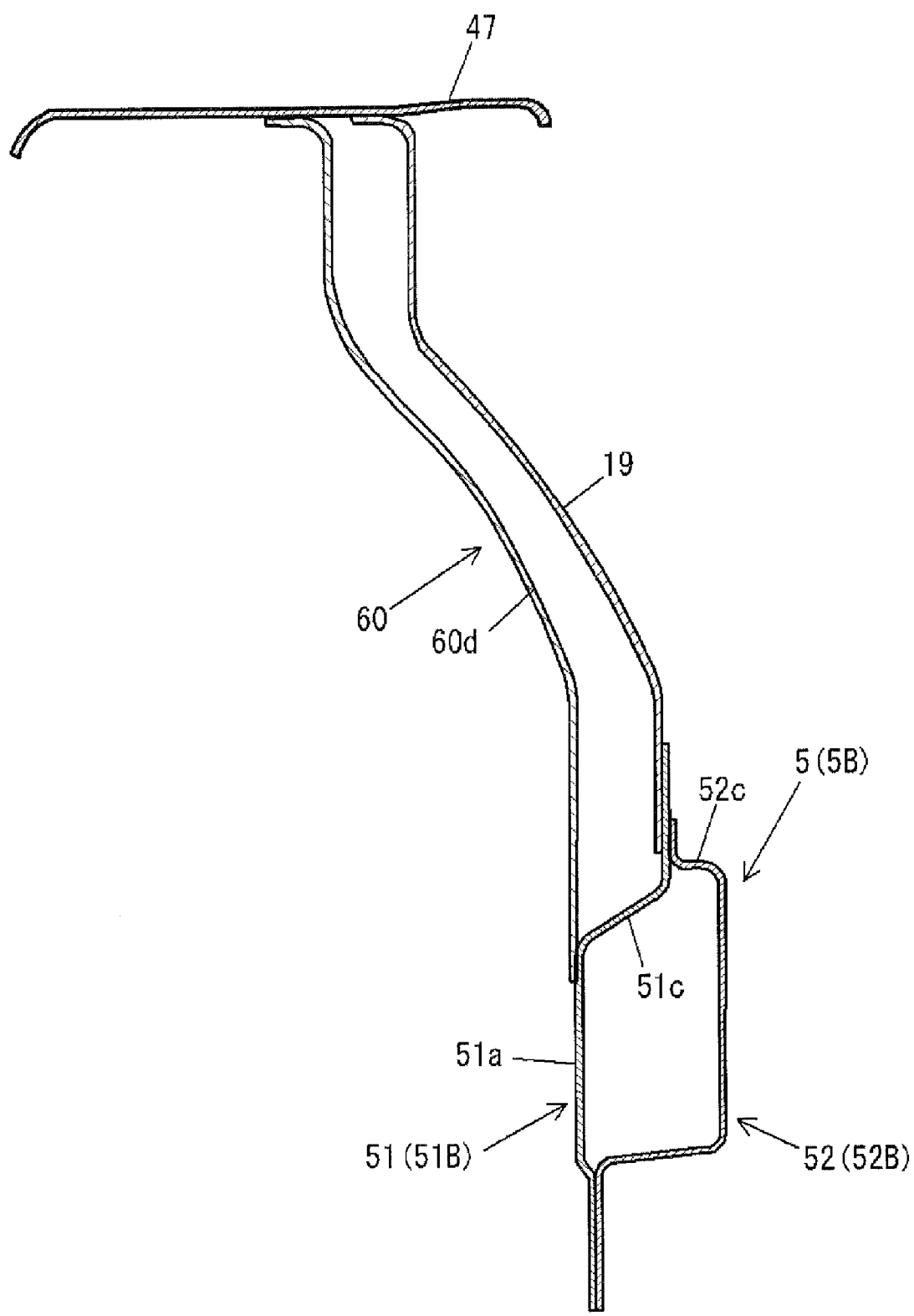
FIG. 14 is a sectional view taken along line K-K of FIG. 2.

The reinforcement member 60 is formed in a curve shape so as to project inward as shown in FIG. 14.

In the present embodiment, as shown in FIGS. 3, 7 and the others, there is provided a second reinforcement member 65 to interconnect the specified portion of the front side frame 5 beside the suspension tower 6a and the specified portion of the dash panel 2 which is located inward from the front side frame 5.

The second reinforcement 65 has a U-shaped cross section (see FIG. 8). Its front end portion is joined to the side face portion 52a of the inside member 52 of the front side frame 5, and its rear end portion is joined to the lower dash cross member 14 which is provided at the front face of the dash panel 2. Herein, as shown in FIG. 4, a front end portion of a tunnel frame 80 which extends substantially in the vehicle longitudinal direction along the tunnel portion 11 is connected to the rear end portion of the second reinforcement member 65 via the lower dash cross member 14 (14A).

Hereinafter, the operation of the present embodiment will be described.

When there occurs a vehicle frontal crash or the like and the impact load is inputted to the bumper reinforcement 9, the impact load acts on the front side frames 5, 5 via the crash boxes 8, 8.

Figure 15A:
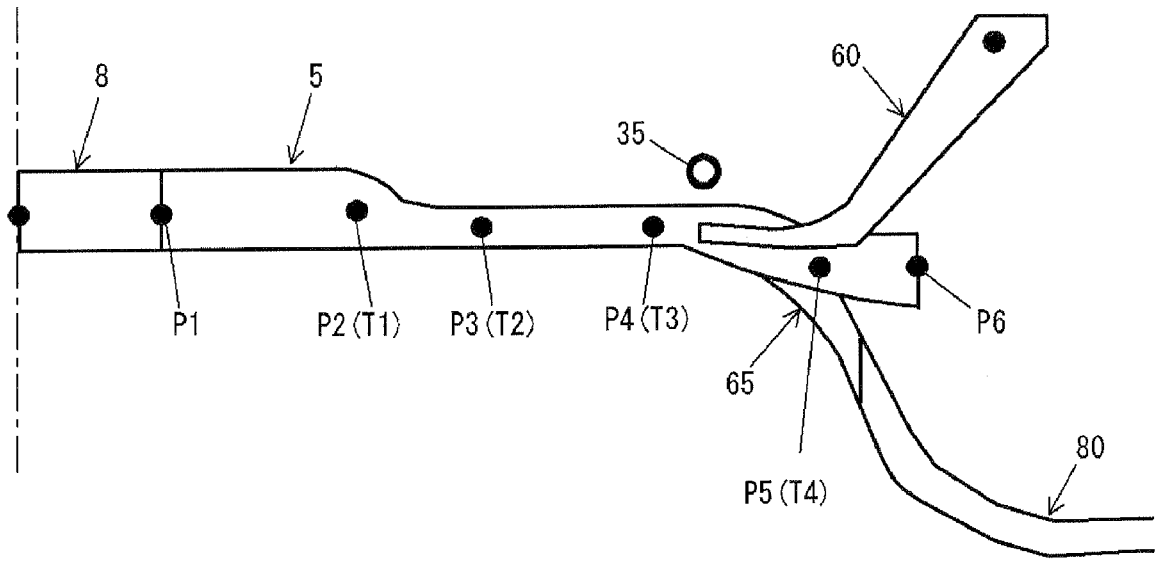
FIGS. 15A, 15B are explanatory diagrams of an action.
Figure 15B:
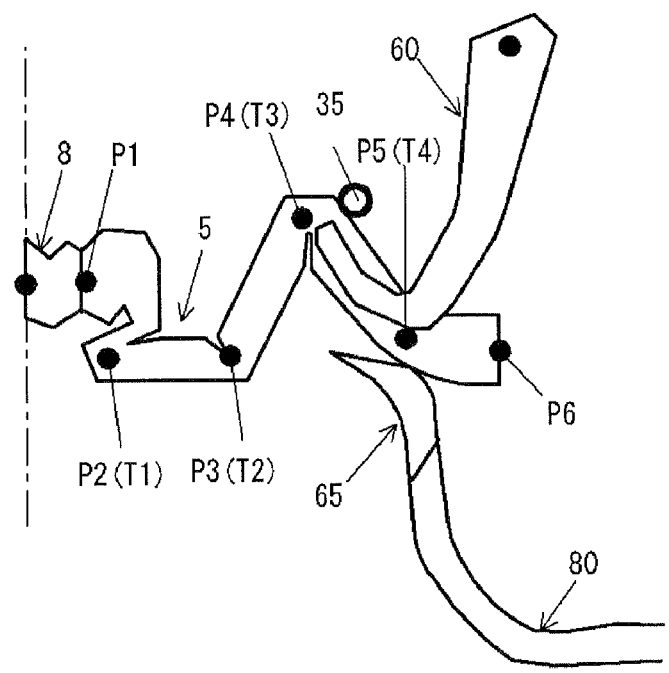

Thereby, the crash box 8 has the compressive deformation in the vehicle longitudinal direction, changing from its original state of FIG. 15A to anther state of FIG. 15B. Further, the front portion (longitudinal positions P1-P2) of the front side frame 5 which is located in front of the suspension tower 6a has the compressive deformation in the vehicle longitudinal direction, and the bend portions T1-T4 (longitudinal positions P2-P5) of the front side frame 5 bend in the vehicle width direction, as described above. Thus, part of the impact load is absorbed by the compressive deformation and the bending. Herein, the longitudinal position P1 is the front end position of the front side frame 5, the longitudinal position P2 is the rear end position (bend portion T1) of the bead 51b of the outside member 51 of the front side frame 5, the longitudinal position P3 is the rear end position (bend portion T2) of the bead 52b of the inside member 52 of the front side frame 5, the longitudinal position P4 is the front end position (bend portion T3) of the reinforcement member 51, the longitudinal position P5 is the position (bend portion T4) of the bead 51e of the outside member 51 of the front side frame 5, and the longitudinal position P6 is the rear end position of the front side frame 5.

In this case, the bend portion T1 bends outward, having the compressive deformation of the portion (longitudinal positions P1-P2) in front of this bend portion T1. The bend portion T2 (longitudinal position P3), the bend portion T3 (longitudinal position P4) and the bend portion T4 (longitudinal position P5) bend respectively in such a manner that the portion between the longitudinal positions P3, P5 projects outward.

Herein, the vertical move of the curve portion 5a is restricted by the reinforcement member 60 as described later.

Figure 16A:
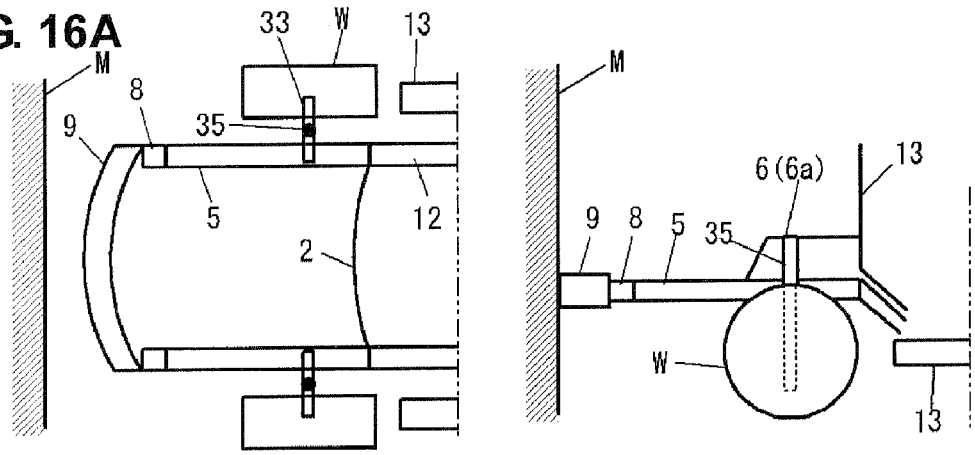
Figure 16B:
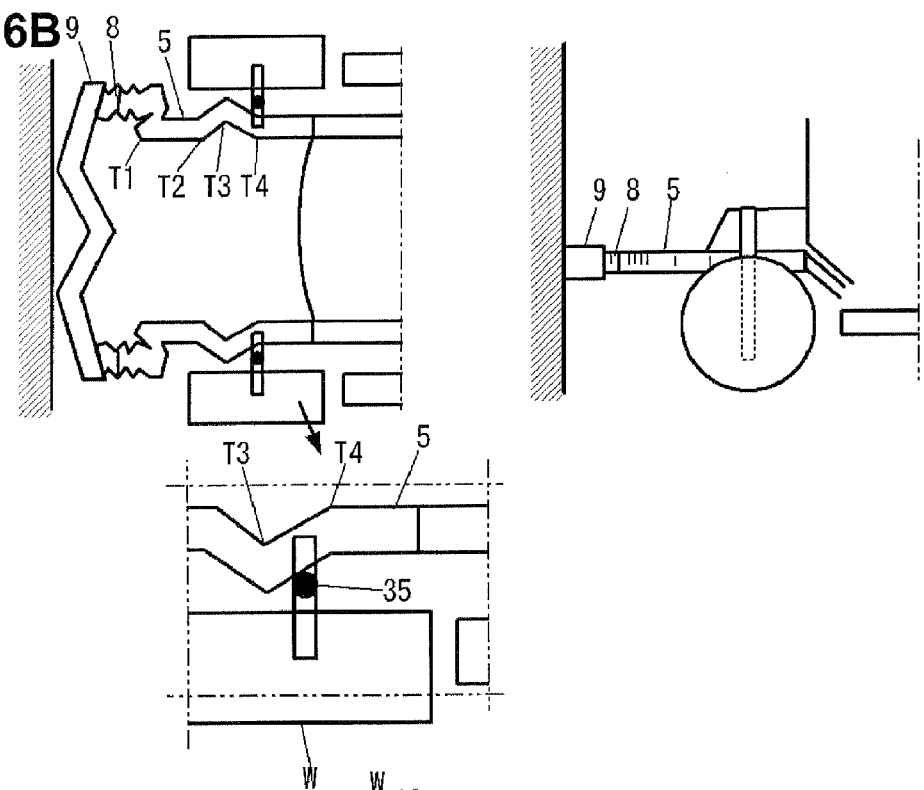

In this case, the bend portion T3 is located slightly in front of the damper 35 of the suspension 30 such that the bend portion T3 (the portion of the front side frame 5 between the longitudinal positions P4, P5) in the outward bending state substantially contacts the damper 35 from the vehicle front side, as shown in FIG. 16B. Accordingly, part of the impact load acting on the front side frame 5 is transmitted to the hinge pillar 3 via the damper 35, the suspension tower 6a and the apron reinforcement 4 (a first route).

Figure 16C:
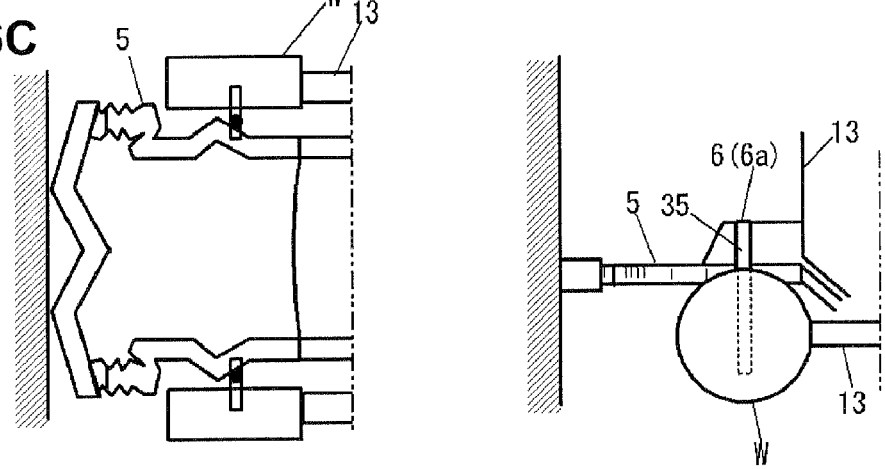

The hitting of the front side frame 5 against the damper 35 pushes back the damper 35, so that the tire W hits against the side sill 13 as shown in FIG. 16C. Thereby, part of the impact load acting on the front side frame 5 is also transmitted to the side sill 13 via the damper 35 and the tire W (a second route).

Thus, according to the present embodiment, the impact load which acts on the front side frame 5 from ahead is dispersed to the hinge pillar 3 and the side sill 13 via the above-described first route and the second route.

Accordingly, it can be properly prevented that the front side frame 5 moves back due to the impact load acting thereon. In particular, in a case in which the curve portion 5a is provided at the rear portion of the front side frame 5, the load acting on this curve portion 5a can be reduced, thereby preventing the improper vertical move of the curve portion Sa and the breakage of the curve portion 5a accordingly. Also, the dash panel 2 can be prevented from being pushed back by the prevention of the front side frame 5 from moving back as well.

Further, since there is provided the connection panel 47 to connect the dash panel 2 to the specified portion of the suspension tower 6a which is near the top portion 6a' of the suspension tower 6a, the part of the impact load which has been dispersed to the suspension tower 6a is transmitted to the hinge pillar 3, in addition to the apron reinforcement 4, via the connection panel 47 and the dash panel 2.

Also, since the connection panel 47 is configured to connect to the apron reinforcement 4, the efficient load transmission can be conducted in corporation with these members.

The front body structure according to the present embodiment can provide the following operations and advantages as well.

Since the connection panel 47 connects the dash panel to the rear wall portion 6d of the suspension tower 6a below the cowl portion 40 (cowl box) and forms the closed cross section X together with the lateral wall portion 41b (bottom wall portion) of the cowl side panel 41 of the cowl portion 40, the part of the impact load which has been dispersed to the suspension tower 6a is effectively transmitted to the hinge pillar 3, in addition to the apron reinforcement 4, via the cowl portion 40 (cowl box), the connection panel 47 and the dash panel 2.

Further, the reinforcement member 60 is configured to form the closed cross section together with the apron panel 19 which forms the body-side-wall inner face between the suspension tower 6a and the dash panel 2 below the side portion of the cowl portion 40 (cowl box) and the lateral wall portion 41b (bottom wall portion) of the cowl portion 40 (cowl box), the properly large closed cross section Y can be provided inward from the apron reinforcement 4 by using the apron panel 19 forming the body-side-wall inner face of the vehicle. Accordingly, the impact load is dispersed in the vehicle width direction, so that the dispersion of the impact load to the hinge pillar 3 can be further effectively conducted.

Also, since the upper arm 32 of the suspension 30 is supported at the reinforcement member 60, the load acting on the upper arm 32 can be received at the reinforcement member 60 firmly and transmitted and dispersed to the suspension tower 6a, dash panel 2 and the like via the reinforcement member 60 effectively. Further, the support portion of the inner end portions 32a, 32a of the upper arm 32 can be formed by using the reinforcement member 60.

The present embodiment can further provide the following operations and advantages in terms of the prevention of the vertical move and the breakage of the curve portion 5a of the front side frame 5 by the reinforcement member 60.

Since the front end portion of the reinforcement member 60 is connected to the specified portion of the front side frame 5 which contacts the wheel house 6a, and its rear end portion is connected to the dash panel 2, the rigidity of the portion of the front side frame 5 between the specified portion contacting the wheel house 6a and the dash panel 2, particularly the vertical rigidity, can be increased. Accordingly, the improper vertical move and the breakage of the frame 5 due to the input of the impact load to the front side frame 5 from ahead can be properly prevented.

While there is a concern that the above-described improper vertical move of the frame 5 might be caused greatly by the provision of the curve portion 5a like the present embodiment, this problem can be properly restrained by the above-described structure of the present embodiment.

Further, since the reinforcement member 60 is connected to the upper dash cross member 16 via the dash panel 2 at its rear portion 60B, the impact load to the reinforcement member 60 from the front side frame 5 can be dispersed to the hinge pillar 3 via the upper dash cross member 16 as well. Accordingly, even in a case in which the impact load is rather great, the prevention of the improper vertical move and the breakage of the front side frame 5 can be properly achieved.

Also, since the rear portion 60B of the reinforcement member 60 expands to the top portion 6a' of the suspension tower 6a of the wheel house 6 and connects to the inner face of that, the impact load to the reinforcement member 60 from the front side frame 5 is dispersed to the dash panel 2 and the top portion 6a' of the suspension tower 6a. Accordingly, even in the case in which the impact load is rather great, the prevention of the improper vertical move and the breakage of the front side frame 5 can be properly achieved.

Further, since the closed cross section Y extending in the vehicle longitudinal direction is formed by the cowl side panel 41 and the rear portion 60B of the reinforcement member 60 between the dash panel 2 and the top portion 6a' of the suspension tower 6a, the rigidity of the portion between the dash panel 2 and the top portion 6a' of the suspension tower 6a is increased. Accordingly, the body portion between the dash panel 2 and the top portion 6a' of the suspension tower 6a becomes hard in the compressive direction, so that the curve portion 5a of the front side frame 5 becomes stronger against the longitudinal compression. Thus, the prevention of the improper vertical move and the breakage can be properly achieved.

In addition, according to the present embodiment, the specified portion of the front side frame 5 which contacts the wheel house 6 is provided in the wheel house 6, the reinforcement member 60 is provided in the wheel house 6 such that its front end portion 60a connects to the above-described specified portion of the front side frame 5 which contacts the wheel house 6, and the rear end portion of the reinforcement member 60 is connected to the dash panel 2, without extending out of the wheel house 6. Accordingly, even if the reinforcement member 60 is provided, any interference with the master cylinder 70 of the brake device and the like which are disposed in back of the wheel house 6 can be properly avoided.

Further, since the reinforcement member 60 has an extension portion 60A (front portion 60A) which extends obliquely forward and downward and connects to the front side frame 5 beside the suspension tower 6a, the improper vertical move of the front side frame 5 can be properly restricted by this extension portion 60A. As a result, the breakage of the frame 5 at the curve portion 5a and its rear move can be prevented.

Herein, if the reinforcement member is one which extends straightly, there is a concern that the bending of the front side frame 5 at the bend portion T4 may be prevented when the impact load acts on the front side frame 5 from ahead.

According to the present embodiment, however, since the reinforcement member 5 is formed so as to curve inward, it can bend in the vehicle width direction easily. The bending of the front side frame 5 at the bend portion T4 can be properly achieved.

Further, the bend portion T3 may be constituted by difference in rigidity between the connection portion of the reinforcement member 60 and an adjacent portion right before this connection portion of the reinforcement member 60.

Also, since there is provided the second reinforcement member 65 which interconnects the specified portion of the front side frame 5 which is near the suspension tower 6a and the specified portion of the dash panel 2 which is located inward from the front side frame 5, the front side frame 5 can be prevented from bending inward at the bend portion T4, so that the outward bending of the front side frame 5 can be achieved surely.

While the bend portion T3 of the front side frame 5 of the present embodiment is constituted by the difference in the longitudinal rigidity at the portion located at the front end portion of the reinforcement member 60, there may be provided further a bead which is provided at the side face portion 52a of the inside member 52 of the front side frame 5 so as to extend vertically and recess outward. Thereby, the outward bending of the front side frame 5 at the bend portion T3 can be ensured.

Figure 17:
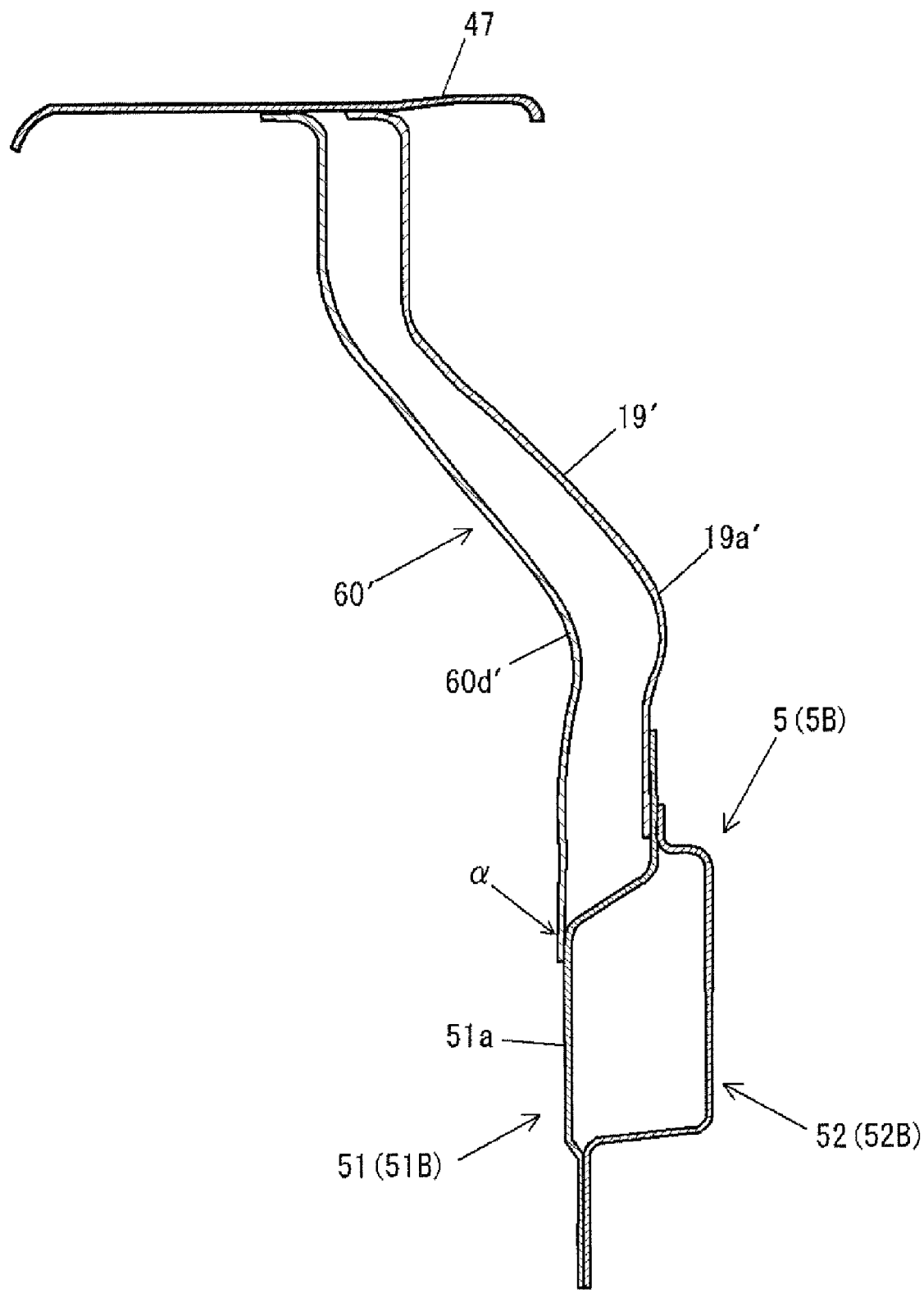
FIG. 17 is a sectional view of another embodiment of the present invention, which corresponds to FIG. 14.

Herein, the reinforcement member 60 may be configured like another embodiment shown in FIG. 17. In this embodiment, a reinforcement member 60' is configured that its side face portion 60d is curved to a position inward from its connection portion a to the side face portion 51a of the outside member 51 of the front side frame 5. Thereby, the reinforcement member 60' can bend more easily in the vehicle width direction, so that the front side frame 5 can be more properly prevented from bending in the vehicle width direction at the bend portion T4. Herein, there may be provided a curve portion 19a' which curves inward at an apron panel 19'. Thereby, the closed cross section which is formed by the apron panel 19' and the reinforcement member 60' can be provided like the above-described previous embodiment.

The present invention should not be limited to the above-described embodiments, and any other modifications and improvements may be applied in the scope of a sprit of the present invention.

What is claimed is:

1. A front body structure of an automotive vehicle, comprising:
   a suspension tower to support a front tire via a suspension;
   a front side frame provided so as to extend in a vehicle longitudinal direction inside the suspension tower;

an apron reinforcement provided so as to interconnect an outside portion of the suspension tower and a front hinge pillar which is provided behind the suspension tower; and a side sill provided so as to extend in the vehicle longitudinal direction behind a wheel house accommodating the front tire;

wherein said front side frame includes a bend portion which is operative to bend outward when an impact load acts on the front side frame from ahead, the bend portion being provided in a specified location such that the bend portion in a bending state substantially contacts a damper of the suspension from a vehicle front side.

2. The front body structure of an automotive vehicle of claim 1, wherein a dash panel is provided between right and left front pillar hinges, and there is provided a connection member to connect the dash panel to a specified portion of the suspension tower which is near a top portion of the suspension tower.

3. The front body structure of an automotive vehicle of claim 2, wherein said connection member is configured to connect to said apron reinforcement.

4. The front body structure of an automotive vehicle of claim 1, wherein a dash panel is provided between right and left front pillar hinges, there is provided a cowl box which extends in a vehicle width direction between an upper portion of the dash panel and an upper portion of the suspension tower, a bottom wall portion of the cowl box is configured to interconnect a rear wall portion of the suspension tower and the dash panel, and there is provided a reinforcement member which is provided below the cowl box so as to interconnect the rear wall portion of the suspension tower and the dash panel and forms a closed cross section together with the bottom wall portion of the cowl box in a vehicle elevation view.

5. The front body structure of an automotive vehicle of claim 4, wherein said reinforcement member is configured to form a closed cross section together with an apron panel which forms a body-side-wall inner face between said suspension tower and said dash panel below a side portion of said cowl box and the bottom wall portion of the cowl box.

6. The front body structure of an automotive vehicle of claim 4, wherein said front side frame is provided so as to curve downward beside the suspension tower and extend below the dash panel, and said reinforcement member has an extension portion which extends obliquely forward and downward and connects to the front side frame beside the suspension tower.

7. The front body structure of an automotive vehicle of claim 4, wherein an upper arm of the suspension is supported at said reinforcement member.

8. The front body structure of an automotive vehicle of claim 1, wherein there is provided a second reinforcement member which interconnects a specified portion of the front side frame which is near the suspension tower and a specified portion of the dash panel which is located inward from the front side frame.

9. A front body structure of an automotive vehicle, comprising:

a suspension tower to support a front tire via a suspension;

a front side frame provided so as to extend in a vehicle longitudinal direction inside the suspension tower;

an apron reinforcement provided so as to interconnect an outside portion of the suspension tower and a front hinge pillar which is provided behind the suspension tower; and a side sill provided so as to extend in the vehicle longitudinal direction behind a wheel house accommodating the front tire;

wherein said front side frame includes a bend portion which is operative to bend outward when an impact load acts on the front side frame from ahead, the bend portion being provided in a specified location such that the bend portion in a bending state substantially contacts a damper of the suspension from a vehicle front side, a dash panel is provided between right and left front pillar hinges, and there is provided a connection member to connect the dash panel to a specified portion of the suspension tower which is near a top portion of the suspension tower, and there is provided a cowl box which extends in a vehicle width direction between an upper portion of the dash panel and an upper portion of the suspension tower, a bottom wall portion of the cowl box is configured to interconnect a rear wall portion of the suspension tower and the dash panel, and there is provided a reinforcement member which is provided below the cowl box so as to interconnect the rear wall portion of the suspension tower and the dash panel and forms a closed cross section together with the bottom wall portion of the cowl box in a vehicle elevation view.

10. A front body structure of an automotive vehicle, comprising:

a suspension tower to support a front tire via a suspension;

a front side frame provided so as to extend in a vehicle longitudinal direction inside the suspension tower;

an apron reinforcement provided so as to interconnect an outside portion of the suspension tower and a front hinge pillar which is provided behind the suspension tower; and a side sill provided so as to extend in the vehicle longitudinal direction behind a wheel house accommodating the front tire;

wherein said front side frame includes a bend portion which is operative to bend outward when an impact load acts on the front side frame from ahead, the bend portion being provided in a specified location such that the bend portion in a bending state substantially contacts a damper of the suspension from a vehicle front side, a dash panel is provided between right and left front pillar hinges, there is provided a cowl box which extends in a vehicle width direction between an upper portion of the dash panel and an upper portion of the suspension tower, a bottom wall portion of the cowl box is configured to interconnect a rear wall portion of the suspension tower and the dash panel, and there is provided a reinforcement member which is provided below the cowl box so as to interconnect the rear wall portion of the suspension tower and the dash panel and forms a closed cross section together with the bottom wall portion of the cowl box in a vehicle elevation view, and there is provided a second reinforcement member which interconnects a specified portion of the front side frame which is near the suspension tower and a specified portion of the dash panel which is located inward from the front side frame.

* * * * *